Patented Jan. 16, 1940

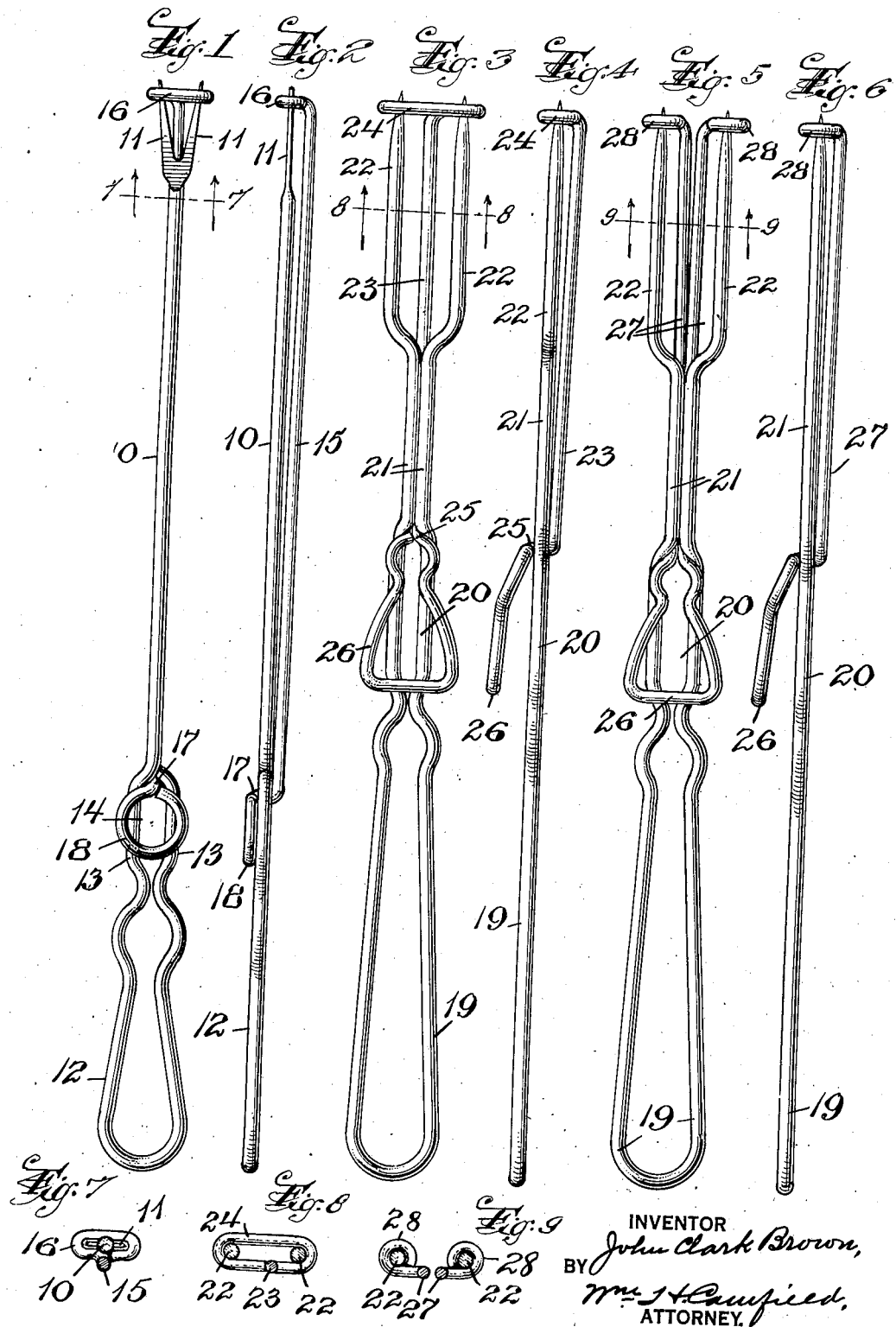
Jan. 16, 1940. J. C. BROWN 2,187,145
EJECTOR FORK
Filed Aug. 7, 1937

2,187,145

UNITED STATES PATENT OFFICE 2,187,145

EJECTOR FORK

John Clark Brown, New York, N. Y.

Application August 7, 1937, Serial No. 157,830

1 Claim. (Cl. 30—129)

This invention relates to an improved fork, particularly designed for use as a table or kitchen tool and which is equipped with a stripper for dislodging articles from the tines of the fork. The stripper is adjacent the handle of the fork in order to be easily operated by the thumb when the hand grasps the handle of the fork.

The invention is designed to provide a fork with two wire members in interlocking relation, the device being without hinges and without any other form of close connection to not only provide a cheaply manufactured article but one easily cleaned and therefore sanitary. There are no recesses or crevices in which matter can lodge and accumulate. The device is made of wire and the parts slide easily thus enabling the stripper to be operated with little effort.

The invention is illustrated in the accompanying drawing. Figure 1 is a top view of a fork embodying my invention. Figure 2 is a side view of the fork shown in Figure 1. Figure 3 is a top view of a fork of modified construction. Figure 4 is a side view of the fork shown in Figure 3. Figure 5 is a top view of another modified form of fork. Figure 6 is a side view of the fork illustrated in Figure 5. Figure 7 is a section on line 7—7 in Figure 1. Figure 8 is a section on line 8—8 in Figure 3. Figure 9 is a section on line 9—9 in Figure 8. Figure 10 is a face view on a reduced scale of still another modified form.

In the form of fork shown in Figures 1, 2 and 7 one member comprises a wire forming a shank 10 which is forked at one end, usually by flattening and then spreading the wire to form the tines 11. This form is well adapted for small forks such as used in extracting pickles and the like from high narrow bottles. The wire extends from the shank 10 to form the handle 12 by being bent back and also expanded as at 13 on each side to form the closed loop 14, by closed loop I mean a loop to limit the extent of movement of a wire within the loop. The second or stripper member comprises a wire 15 lying under the shank 10 and provided at its outer end with a loop or stripper 16 encircling the work. The wire 15 at the other end is passed through the loop 14, as at 17 and above the loop it forms a thumb-piece 18. The thumb-piece 18 is preferably wider than the loop 14 and it therefore co-operates with the stripper 16 to hold the two members together without additional fastening. The loop 14 is shorter than the tines 11 to prevent the stripper riding off the ends of the tines.

In Figures 3, 4 and 8 I show a modified form of fork, of heavier construction such as used in handling chops and steaks or corn on the ear, and with the parts differently proportioned. The handle member comprises a wire bent to form the handle 19 and the closed loop 20 and then extended to form a shank 21 consisting of two reaches of wire side by side to form a stiff shank and terminating in the tines 22. The wire extends through the loop 20 and 25 and is bent to form the thumb-piece or finger-piece 25.

In Figures 5, 6 and 9 the structure is slightly modified to the extent that the stripper member consists of a wire formed of two strands 27 each with a loop 28 to act as a stripper on a tine 22, the strands being extended from the thumb-piece 26.

It will be evident that wire of any suitable cross-sectional shape can be used but round wire is preferable as the points of contact are not broad and the parts slide easily on each other.

The use of the device is simple. The handle is grasped by the hand and the thumb is used to draw back the thumb-piece, as 16, to withdraw the stripper to the rear of the fork. When an article on the tines is to be removed the fork need not be shaken but the thumb-piece is simply pushed from the handle and the stripper removes the article from the tines.

I claim:

A fork made of two pieces of wire, one wire being bent to produce a forked end, an intermediate shank portion and a handle end containing two loops arranged end to end, all the parts being aligned, the second wire having one end passing through the innermost of said loops of the first wire and formed at its end into a finger piece and having an intermediate portion slidable parallel to and under the shank of the first wire and having a loop on its other end to form a stripper embracing the forked end of the first wire.

JOHN CLARK BROWN.